US009526095B2

(12) United States Patent
Worrall et al.

(10) Patent No.: US 9,526,095 B2
(45) Date of Patent: Dec. 20, 2016

(54) METHOD AND APPARATUS FOR CONFIGURING A PLURALITY OF SCHEDULING REQUEST TRIGGERS

(75) Inventors: Chandrika K. Worrall, Newbury (GB); Sudeep K. Palat, Swindon (GB); Pingping Wen, Shanghai (CN)

(73) Assignee: Alcatel Lucent, Boulogne-Billancourt (FR)

(*) Notice: Subject to any disclaimer, the term of this patent is extended or adjusted under 35 U.S.C. 154(b) by 77 days.

(21) Appl. No.: 14/385,929

(22) PCT Filed: Mar. 19, 2012

(86) PCT No.: PCT/CN2012/072550
§ 371 (c)(1),
(2), (4) Date: Sep. 17, 2014

(87) PCT Pub. No.: WO2013/138983
PCT Pub. Date: Sep. 26, 2013

(65) Prior Publication Data
US 2015/0049697 A1 Feb. 19, 2015

(51) Int. Cl.
*H04W 72/04* (2009.01)
*H04W 72/12* (2009.01)
*H04W 74/08* (2009.01)

(52) U.S. Cl.
CPC ....... *H04W 72/0413* (2013.01); *H04W 72/048* (2013.01); *H04W 72/1289* (2013.01); *H04W 74/0833* (2013.01)

(58) Field of Classification Search
None
See application file for complete search history.

(56) References Cited

U.S. PATENT DOCUMENTS

2011/0199991 A1* 8/2011 Harris ............... H04W 72/1263
370/329

FOREIGN PATENT DOCUMENTS

CN 101355788 A 1/2009
CN 101562894 A 10/2009
(Continued)

OTHER PUBLICATIONS

Nokia, "Buffer Reporting for E-UTRAN," 3GPP TSG-RAN WG2 Meeting #52, Athens, Greece, Mar. 27-31, 2006, R2-060829, Agenda item: 6.5, Document for: Discussion and Decision, 5 pages.
(Continued)

*Primary Examiner* — Kwang B Yao
*Assistant Examiner* — Adam Duda
(74) *Attorney, Agent, or Firm* — Fay Sharpe, LLP

(57) ABSTRACT

The invention provides a method and apparatus for configuring a plurality of scheduling request triggers for a user equipment in a communication system. First, the base station determines a plurality of scheduling request triggers and a transmission type of each of the plurality of scheduling request triggers for the user equipment, based on the service characteristics of services of the user equipment; and then the base station transmits configuration information of the plurality of scheduling request triggers to the user equipment, the configuration information of the plurality of scheduling request triggers including the allocation way of the plurality of scheduling request triggers with respect to the services of the user equipment and the transmission type of each of the plurality of scheduling request triggers. The user equipment first receives the configuration information from the base station. After that the user equipment selects a scheduling request trigger corresponding to the current service based on the service characteristics of current service to be transmitted and the allocation way, and transmits the
(Continued)

triggered scheduling request via the transmission type corresponding to the scheduling request trigger. By applying the technical solution of the invention, the efficient radio resource utilization could be achieved.

9 Claims, 1 Drawing Sheet

(56) References Cited

FOREIGN PATENT DOCUMENTS

| CN | 102202405 A | 9/2011 |
|---|---|---|
| EP | 2 675 081 A1 | 12/2013 |
| JP | 2009-521892 A | 6/2009 |
| JP | 2009-524978 A | 7/2009 |
| JP | 2010-530707 A | 9/2010 |
| JP | 2011-518468 A | 6/2011 |
| KR | 10-2010-0094534 A | 8/2010 |
| KR | 10-2010-0116120 A | 10/2010 |
| WO | 2013/096551 A1 | 6/2013 |

OTHER PUBLICATIONS

Ericsson et al., "Framework for Scheduling Request and Buffer Status Reporting," TSG-RAN WG2 Meeting #60, Jeju, Korea, Nov. 5-9, 2007, Tdoc R2-074691, Agenda Item: 5.1.1.8, Document for: Discussion, Decision, 4 pages.

Ericsson et al., "D-SR failure handling," TSG-RAN WG2 Meeting #63bis, Prague, Czech Republic, Sep. 29-Oct. 3, 2008, R2-085703 (Revised R2-085388) (Updated R2-084006), Agenda Item: 6.1.1.6, Document for: Discussion and decision, 4 pages.

International Search Report for PCT/CN2012/072550 dated Dec. 20, 2012.

* cited by examiner

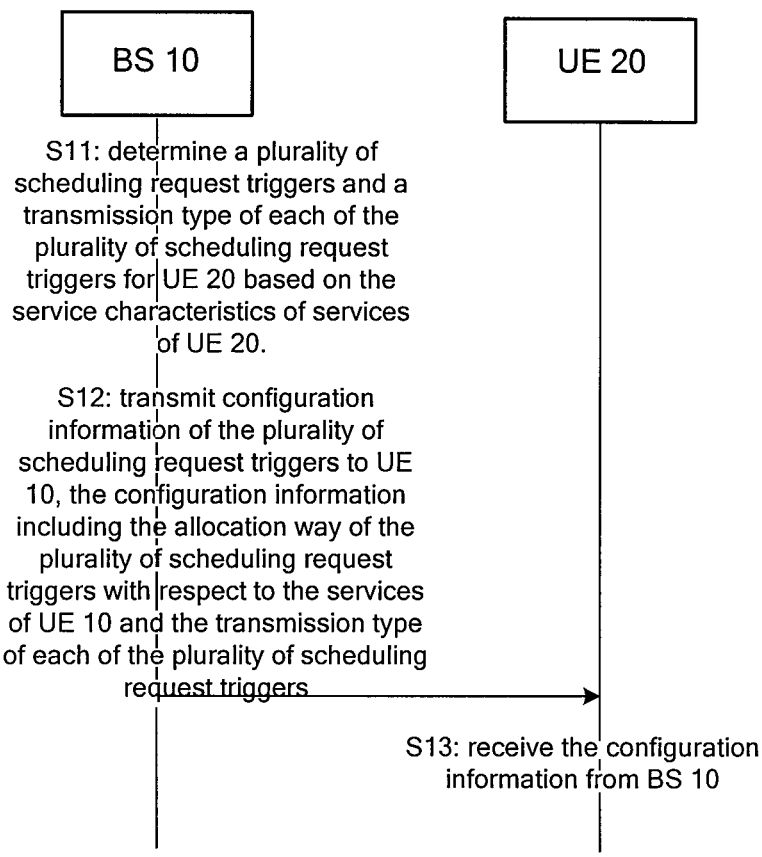

METHOD AND APPARATUS FOR CONFIGURING A PLURALITY OF SCHEDULING REQUEST TRIGGERS

FIELD OF THE INVENTION

The application relates to a LTE communication system, and particularly to the configuration of a plurality of scheduling request triggers in the LTE communication system.

BACKGROUND OF THE INVENTION

Current scheduling request (SR) procedure is designed such that the scheduling request is initiated per user equipment (UE). There is only one scheduling request possible at a time per UE. If the buffer status report (BSR) is triggered due to the arrival of data in buffer, and there is no uplink (UL) resource for the transmission of the triggered BSR, the scheduling request is triggered. According to the current 3GPP specification, there are two possibilities for the transmission of the scheduling request by a RRC-connected mode UE: either on dedicated scheduling request resource if dedicated-scheduling request resources (D-SR) are configured or on RACH if there is no D-SR configured for the UE. Only one type of SR transmission could be considered at a time.

Considering one SR per UE, the service characteristics of services of UE is not reflected in the SR trigger. For example, if one kind of service has very low latency requirement, the SR trigger due to data arrival of this service could be relaxed. On the other hand, services with strict latency requirement would require urgent triggering of SR.

Therefore, it would be desirable to configure a plurality of scheduling request triggers for UE based on the service characteristics of services of UE.

OBJECT AND SUMMARY OF THE INVENTION

In one aspect of the invention, there is provided a method of configuring a plurality of scheduling request triggers for a user equipment in a base station of a communication system, the method comprising the steps of: determining a plurality of scheduling request triggers and a transmission type of each of the plurality of scheduling request triggers for the user equipment, based on the service characteristics of services of the user equipment; and transmitting configuration information of the plurality of scheduling request triggers to the user equipment, the configuration information of the plurality of scheduling request triggers including the allocation way of the plurality of scheduling request triggers with respect to the services of the user equipment and the transmission type of each of the plurality of scheduling request triggers.

Advantageously, the service characteristics of the services of the user equipment may be characterized by any one of:
QoS of bearers of the user equipment;
groups of logical channels;
different types of buffer status reports;
characteristic of the application running.

Advantageously, the transmission type of each of the plurality of scheduling request triggers is determined based on the priority of the service corresponding to the scheduling request trigger.

Advantageously, the transmission type may be any one of: transmission on RACH;
transmission on dedicated scheduling request resources.

In another aspect of the invention, there is provided a method of receiving configuration information related to a plurality of scheduling request triggers from a base station in a user equipment of a communication system, the method comprising the step of: receiving configuration information related to a plurality of scheduling requests from the base station, the configuration information including the allocation way of the plurality of scheduling request triggers with respect to the services of the user equipment and the transmission type of each of the plurality of scheduling request triggers.

Advantageously, the above method may further comprise the steps of: based on the service characteristics of current service to be transmitted and the allocation way, select a scheduling request trigger corresponding to the current service; and transmitting the triggered scheduling request via the transmission type corresponding to the scheduling request trigger.

In another aspect of the invention, there is provided a method of handling a plurality of triggered scheduling requests, the method comprising the step of: canceling the trigger of the scheduling request of lower priority when a scheduling request of higher priority is triggered.

In another aspect of the invention, there is provided a method of handling a plurality of triggered scheduling requests, the method comprising the step of: continuing to transmit the triggered scheduling request of lower priority on RACH or canceling the transmission of the triggered scheduling request of lower priority on RACH when the transmission of the triggered scheduling request of higher priority is started.

In another aspect of the invention, there is provided an apparatus for configuring a plurality of scheduling request triggers for a user equipment in a base station of a communication system, the apparatus comprises: a first unit for determining a plurality of scheduling request triggers and a transmission type of each of the plurality of scheduling request triggers for the user equipment, based on the service characteristics of services of the user equipment; and a second unit for transmitting configuration information of the plurality of scheduling request triggers to the user equipment, the configuration information of the plurality of scheduling request triggers including the allocation way of the plurality of scheduling request triggers with respect to the services of the user equipment and the transmission type of each of the plurality of scheduling request triggers.

By applying the technical solution of the invention, the efficient radio resource utilization could be achieved.

BRIEF DESCRIPTION OF THE DRAWINGS

The invention is explained in further detail, and by way of example, with reference to the accompanying drawings wherein:

FIG. 1 shows a flowchart of a method of configuring a plurality of scheduling request triggers for a user equipment in a communication system.

Throughout the above drawings, like reference numerals will be understood to refer to like, similar or corresponding features or functions.

DETAILED DESCRIPTION

Hereinafter, the technical solution of the above first aspect of the invention and the technical solution of the above second aspect of the invention will be described respectively in great detail.

The range of applications run in mobile networks is expanding, and these applications may have diverse service characteristics. These applications may comprise background application which only generates data very infrequently and there is no requirement for urgency in transmission of data generated by the background application. Besides, these applications may further comprise other applications which could generate data of high priority. Therefore there is a need of configuring different scheduling request triggers for these different applications, i.e. different services.

FIG. 1 shows a flowchart of a method of configuring a plurality of scheduling request triggers for a user equipment in a communication system. The communication system may be a LTE communication system, for example.

Referring to FIG. 1, first, in Step S11, the base station 10 (BS 10) determines, based on the service characteristics of services of the user equipment 20 (UE 20), a plurality of scheduling request triggers and a transmission type of each of the plurality of scheduling request triggers for UE 20.

UE 20 may be a RRC-connected UE, for example.

The service characteristics of the services of UE 20 may be characterized by any one of:
QoS of bearers of the user equipment;
groups of logical channels;
different types of buffer status reports;
characteristic of the application running.

The transmission type of each of the plurality of scheduling request triggers may be determined based on the priority of the service corresponding to the scheduling request trigger.

Next, in Step S12, BS 10 transmits configuration information of the plurality of scheduling request triggers to UE 10. The configuration information includes the allocation way of the plurality of scheduling request triggers with respect to the services of UE 10 and the transmission type of each of the plurality of scheduling request triggers.

In one embodiment, a dedicated RRC signaling may be used for transmitting the configuration information to UE 20. In another embodiment, a broadcast signaling may be used for communicating the configuration information to the UE 20.

Then, in Step S13, UE 20 receives the configuration information from BS 10.

After that, if some data of one service (i.e. current service) arrived at the UL buffer and there is no UL resource available to transmit BSR, UE 20 first selects, based on the service characteristics of current service and the allocation way the plurality of scheduling request triggers with respect to the services of UE 20, a scheduling request trigger corresponding to the current service, and then transmits the triggered scheduling request via the transmission type corresponding to the selected scheduling request trigger.

When to configure a plurality of scheduling request triggers for UE 20 is up to the network implementation. One possible example is that the network may run a dormancy-like timer at the network for UE 20. If there is no user plane data other than what generated from the background traffic for the period defined by dormancy-like timer, the network may configure a plurality of scheduling request triggers for UE 20.

SR triggers may be configured considering lack of traffic from high priority bearers, lack of high priority bearers, and/or change of QoS requirement.

To be specific, it is assumed that UE 20 has two types of services, one is generated by background application ('background service' for short) and the other is generated by high priority application (for example, video service). As background service has a delay tolerant and video service has a strict latency requirement, two different scheduling request triggers are respectively configured for these two services with different service characteristics. For simplicity, hereinafter, the scheduling request trigger configured for background service is called as RS1, and the scheduling request trigger configured for video service is called as RS0.

RS0 and RS1 can be transmitted via different transmission types due to different latency requirements of background service and video service.

In one example, RS0 and RS1 may be transmitted on RACH with different RACH configurations. The RACH configuration for RS0 transmission has short PRACH periodicity and low access collision probability as video service has strict latency requirement; while the RACH configuration for SR1 has large periodicity and high access collision probability as background service is delay tolerance and has relaxed QoS requirement. The RACH configuration may take on different forms. For example, as described above, the RACH configuration for RS0 transmission may comprise the time and/or frequency resource and the periodicity of RACH on which RS0 is transmitted, and the RACH configuration for RS1 transmission may comprise the time and/or frequency resource and the periodicity of RACH on which RS1 is transmitted. For another example, the RACH configuration for RS0 transmission may comprise the group of preambles of RACH for RS0 transmission, and the RACH configuration for SR1 transmission may comprise the group of preambles of RACH for RS1 transmission. The number of preambles for RS1 transmission is less than that of RS0 transmission due to the fact that background service has a relax latency requirement and has a tolerance for high collision probability. It is to be noted that, based on RACH configurations of RS0 and RS1, corresponding RA-RNTI can be derived for differentiating RA response for RS0 and RS1.

Alternatively, RS0 may be transmitted on RACH and RS1 may be transmitted on configured D-SR with large periodicity.

After determination of the allocation way (RS0 and RS1) of the scheduling request triggers with respect to two types of services as well as the respective transmission type of RS0 and RS1,all these configuration information is transmitted to UE 20 by BS 10.

When UE 20 receives the configuration information, i.e. the allocation way (RS0 and RS1) of the scheduling request triggers with respect to two types of services as well as the respective transmission type of RS0 and RS1, from BS 10, it can assign different scheduling request triggers for different types of services based on this configuration information.

Since a plurality of scheduling request triggers are configured for UE 10, there may be a situation that more than one scheduling request triggers occur at the same time. The solutions can be as follows.

When a scheduling request of higher priority (for example, 'RS0' described above) is triggered, the trigger of the scheduling request of lower priority (for example, 'RS1' described above) may be canceled.

When the transmission of the triggered scheduling request of higher priority (for example, 'RS0' described above) is started, the transmission of the triggered scheduling request of lower priority (for example, 'RS1' described above) on RACH may be continued or just canceled.

The scenario described above is that UE 20 has two types of services. In another scenario where only background service exists, BS 10 may keep UE 20 running in a RRC-connected mode so as to reduce signaling overhead over the radio/core network interface. As for the scheduling request trigger corresponding to background service, BS 10 may configure D-SR with very large periodicity for this SR transmission, or may release D-SR. Even though there is no urgency of transmission of traffic generated by background applications, the RRC connected UEs may require fast access to the network in order to deliver measurement reports for mobility support and also upon the arrival of data from application with stringent latency requirement, and the SRs for these kinds of services can be transmitted on RACH. RA procedure and RACH capacity is designed in this scenario to satisfy the low latency requirement and hence the collision probability on the RA access is kept low. Additionally physical resources for RACH (time and/or frequency resources) is configured frequently in order to reduce the UE's wait time for a RACH opportunity.

Another example where the use of multiple SR triggers benefit is the MTC devices which provide multiple services. In one scenario, the MTC device may be performing as meter reading while the same time displaying a TV channel. In such a scenario, the SR triggers due to different application is useful in achieving high resource efficiency.

In another aspect of the invention, there is provided an apparatus for configuring a plurality of scheduling request triggers for a user equipment in a base station of a communication system, the apparatus comprising: a first unit for determining a plurality of scheduling request triggers and a transmission type of each of the plurality of scheduling request triggers for the user equipment, based on the service characteristics of services of the user equipment; and a second unit for transmitting configuration information of the plurality of scheduling request triggers to the user equipment, the configuration information of the plurality of scheduling request triggers including the allocation way of the plurality of scheduling request triggers with respect to the services of the user equipment and the transmission type of each of the plurality of scheduling request triggers.

In another aspect of the invention, there is provided an apparatus for receiving configuration information related to a plurality of scheduling request triggers from a base station in a user equipment of a communication system, the apparatus comprising: a third unit for receiving configuration information related to a plurality of scheduling requests from the base station, the configuration information including the allocation way of the plurality of scheduling request triggers with respect to the services of the user equipment and the transmission type of each of the plurality of scheduling request triggers.

It should be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method of configuring a plurality of scheduling request triggers for a user equipment in a base station of a communication system, the method comprising:
   determining a plurality of scheduling request triggers and a transmission type of each of the plurality of scheduling request triggers for the user equipment, based on the service characteristics of services of the user equipment;
   transmitting configuration information of the plurality of scheduling request triggers to the user equipment, the configuration information of the plurality of scheduling request triggers including the allocation way of the plurality of scheduling request triggers with respect to the services of the user equipment and the transmission type of each of the plurality of scheduling request triggers;
   wherein the transmission type of each of the plurality of scheduling request triggers is determined based on the priority of the service corresponding to the scheduling request trigger;
   wherein the transmission type is any one of:
      transmission on RACH;
      transmission on dedicated scheduling request resources; and
   wherein when the transmission type is the transmission on RACH, the transmission type includes RACH configuration and the RACH configuration includes physical resources of PRACH.

2. The method of claim 1, wherein the service characteristics of the services of the user equipment is characterized by any one of:
   QoS of bearers of the user equipment;
   groups of logical channels;
   different types of buffer status reports;
   characteristic of the application running.

3. The method of claim 1, wherein the physical resources allocated to PRACH comprises any one of:
   the time resource and the periodicity of RACH;
   the group of preambles of RACH.

4. The method of claim 1, wherein the configuration information is transmitted via a dedicated RRC signaling or a broadcast signaling.

5. The method of claim 1, wherein the user equipment is a RRC-connected user equipment.

6. The method of claim 1, wherein the communication system is a LTE communication system.

7. A method of configuring a plurality of scheduling request triggers for a user equipment in a base station of a communication system, the method comprising:
   determining a plurality of scheduling request triggers and a transmission type of each of the plurality of scheduling request triggers for the user equipment, based on the service characteristics of services of the user equipment;
   transmitting configuration information of the plurality of scheduling request triggers to the user equipment, the configuration information of the plurality of scheduling request triggers including the allocation way of the plurality of scheduling request triggers with respect to the services of the user equipment and the transmission type of each of the plurality of scheduling request triggers;
   wherein the transmission type of each of the plurality of scheduling request triggers is determined based on the priority of the service corresponding to the scheduling request trigger;

wherein the transmission type is any one of:
　transmission on RACH;
　transmission on dedicated scheduling request resources; and
wherein when one service of the user equipment is the service generated by background application, the scheduling request trigger corresponding to the service generated by background application is configured to be transmitted on the dedicated scheduling request resources with large periodicity while the other scheduling request triggers among the plurality of scheduling request triggers are configured to be transmitted on RACH with different RACH configurations.

8. A method of configuring a plurality of scheduling request triggers for a user equipment in a base station of a communication system, the method comprising:
　determining a plurality of scheduling request triggers and a transmission type of each of the plurality of scheduling request triggers for the user equipment, based on the service characteristics of services of the user equipment;
　transmitting configuration information of the plurality of scheduling request triggers to the user equipment, the configuration information of the plurality of scheduling request triggers including the allocation way of the plurality of scheduling request triggers with respect to the services of the user equipment and the transmission type of each of the plurality of scheduling request triggers;
　wherein the transmission type of each of the plurality of scheduling request triggers is determined based on the priority of the service corresponding to the scheduling request trigger;
　wherein the transmission type is any one of:
　　transmission on RACH;
　　transmission on dedicated scheduling request resources; and
　wherein when one service of the user equipment is the service generated by background application, all the plurality of scheduling request triggers are configured to be transmitted on RACH with different RACH configurations.

9. An apparatus for configuring a plurality of scheduling request triggers for a user equipment in a base station of a communication system, the apparatus comprises:
　a first unit for determining a plurality of scheduling request triggers and a transmission type of each of the plurality of scheduling request triggers for the user equipment, based on the service characteristics of services of the user equipment;
　a second unit for transmitting configuration information of the plurality of scheduling request triggers to the user equipment, the configuration information of the plurality of scheduling request triggers including the allocation way of the plurality of scheduling request triggers with respect to the services of the user equipment and the transmission type of each of the plurality of scheduling request triggers;
　wherein the transmission type of each of the plurality of scheduling request triggers is determined based on the priority of the service corresponding to the scheduling request trigger;
　wherein the transmission type is any one of:
　　transmission on RACH;
　　transmission on dedicated scheduling request resources; and
　wherein when the transmission type is the transmission on RACH, the transmission type includes RACH configuration and the RACH configuration includes physical resources of PRACH.

* * * * *